United States Patent
Park et al.

(10) Patent No.: US 9,743,399 B2
(45) Date of Patent: Aug. 22, 2017

(54) METHODS AND ARRANGEMENTS TO SIGNAL SHORT INTERFRAME SPACES

(71) Applicant: Intel Corporation, Santa Clara, CA (US)

(72) Inventors: Minyoung Park, Portland, OR (US); Eldad Perahia, Portland, OR (US); Thomas Tetzlaff, Portland, OR (US); Thomas Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 13/725,124

(22) Filed: Dec. 21, 2012

(65) Prior Publication Data
US 2014/0071956 A1   Mar. 13, 2014

Related U.S. Application Data

(60) Provisional application No. 61/698,562, filed on Sep. 7, 2012.

(51) Int. Cl.
*H04L 12/807* (2013.01)
*H04W 72/04* (2009.01)
(Continued)

(52) U.S. Cl.
CPC ....... *H04W 72/0446* (2013.01); *H04L 1/1628* (2013.01); *H04L 43/067* (2013.01);
(Continued)

(58) Field of Classification Search
CPC . H04W 72/02; H04W 8/005; H04W 52/0216; H04L 1/1628; H04L 43/067; H04L 47/27; H04B 7/14
See application file for complete search history.

(56) References Cited

U.S. PATENT DOCUMENTS 7,304,975 B2   12/2007   Shvodian
2005/0220145 A1*   10/2005   Nishibayashi et al. ....... 370/474
(Continued)

OTHER PUBLICATIONS

International Search Report and Written Opinion, mail date Oct. 14, 2013, PCT/ISA/210, PCT/ISA/220, and PCT/ISA/237, total of 10 pages.
(Continued)

*Primary Examiner* — Andrew Chriss
*Assistant Examiner* — Salvador E Rivas
(74) *Attorney, Agent, or Firm* — Schwegman Lundberg & Woessner, P.A.

(57) ABSTRACT

Generally, embodiments to enable, indicate and detect Short Interframe Space (SIFS) of different time durations, a short (or small) SIFS which is shorter in duration than a regular SIFS, are described herein. Embodiments may comprise logic such as hardware and/or code to signal a short SIFS or a regular SIFS by setting or clearing a bit of a management frame transmitted by a station to an access point during the network association process, or by setting or clearing a bit in the SIG field of the preamble of a data unit transmitted by an access point to an associated station. In some embodiments, a third party station is able to receive the data unit sent by the access point, and decode, e.g., the SIG field bit to determine whether the short SIFS duration or regular SIFS duration is defined for the communication between the access point and the station.

19 Claims, 7 Drawing Sheets

(51) Int. Cl.
*H04L 12/26* (2006.01)
*H04L 1/16* (2006.01)
*H04W 52/02* (2009.01)
*H04B 7/14* (2006.01)

(52) U.S. Cl.
CPC ......... *H04L 47/27* (2013.01); *H04W 72/0406* (2013.01); *H04B 7/14* (2013.01); *H04W 52/0216* (2013.01)

(56) References Cited

U.S. PATENT DOCUMENTS

| | | | |
|---|---|---|---|
| 2006/0107166 A1 | 5/2006 | Nanda | |
| 2007/0217378 A1* | 9/2007 | Moorti | H04L 1/1607 370/338 |
| 2008/0002615 A1* | 1/2008 | Nakajima | H04L 1/1614 370/328 |
| 2008/0130538 A1* | 6/2008 | Raissinia | H04W 28/06 370/310 |
| 2011/0026446 A1 | 2/2011 | Stacey | |
| 2011/0149798 A1 | 6/2011 | Cordeiro et al. | |
| 2012/0099450 A1* | 4/2012 | Madan | H04W 74/0816 370/252 |
| 2012/0170565 A1* | 7/2012 | Seok | H04L 27/2602 370/338 |
| 2013/0083722 A1* | 4/2013 | Bhargava et al. | 370/315 |
| 2013/0148640 A1* | 6/2013 | Li | H04L 1/1854 370/338 |

OTHER PUBLICATIONS

International Preliminary Report on Patentability mailed Mar. 19, 2015 for corresponding International Patent Application No. PCT/US2013/047697 (4 pages).

* cited by examiner

| PHYSICAL LAYER PROTOCOL DATA UNIT 1060 | 8μs*N | 8μs*N | 8μs*N | 4μs*N PER LTF | |
|---|---|---|---|---|---|
| | STF 1064 | LTF 1066 | 11AH-SIG 1068 | ADDITIONAL LTFS 1069 | DATA 1070 |

PREAMBLE STRUCTURE 1062

FIG. 1(a)

| PHYSICAL LAYER PROTOCOL DATA UNIT 1080 | 8μs*N | 8μs*N | 8μs*N | |
|---|---|---|---|---|
| | STF 1064 | LTF 1066 | 11AH-SIG 1068 | DATA 1070 |

PREAMBLE STRUCTURE 1082

FIG. 1(b)

| 11AH-SIG 1100 | MCS 1104 | BW 1106 | LENGTH 1108 | BF 1110 | STBC 1112 | CODING 1114 | AGGREGATION 1116 | SGI 1118 | CRC 1120 | TAIL 1122 |
|---|---|---|---|---|---|---|---|---|---|---|

FIG. 1(c)

METHODS AND ARRANGEMENTS TO SIGNAL SHORT INTERFRAME SPACES

CROSS-REFERENCE TO RELATED APPLICATIONS

This application claims priority from U.S. Provisional application No. 61/698,562, filed on Sep. 7, 2012, which is incorporated herein by reference in its entirety.

FIELD OF THE INVENTION

Embodiments described herein are generally related to the field of wireless communications. More particularly, the embodiments are related to short inter-frame spaces between packets communicated between wireless transmitters and receivers.

BACKGROUND

Definitions—(a) Wireless medium (WM): The medium used to implement the transfer of protocol data units (PDUs) between peer physical layer (PHY) entities of a wireless local area network (LAN); (b) Station (STA): Any device that contains an IEEE 802.11-conformant medium access control (MAC) and physical layer (PHY) interface to the wireless medium; (c) Access Point (AP): Any entity that has a station (STA) functionality and provides access to the distribution services, via the wireless medium for associated STAs; and (d) Beacon Frame: A Beacon frame is one of the management frames in IEEE 802.11 based WLANs. It contains all the information about the network. Beacon frames are transmitted periodically to announce the presence of a Wireless LAN network. Beacon frames are transmitted by the Access Point (AP) in an infrastructure BSS. In IBSS network beacon generation is distributed among the stations. For example, a Beacon frame can include a MAC header, Frame body and FCS and have fields including a timestamp field, a beacon interval field which is a time-interval between beacon transmissions, and capability information field which can span 16 bits and contain information about capability of the device/network.

The IEEE (Institute of Electrical and Electronics Engineers) 802.11ah specification framework as defined in the Specification Framework for TGah, 802.11-11/1137r12 (https://mentor.ieee.org/802.11/dcn/11/11-11-1137-12-00ah-specification-framework-for-tgah.docx) prescribes support for 2 MHz channel bandwidth with 64-FFT (Fast Fourier Transform), which may reuse most of the physical layer (PHY) designs of the 20 MHz mode defined in the IEEE 802.11ac specification framework IEEE P802.11ac/D4.1-Part11: Wireless LAN Medium Access Control (MAC) and Physical Layer (PHY) specifications—Amendment 4: Enhancements for Very High Throughput for Operation in Bands below 6 GHz (http://www.ieee802.org/11/private/Draft_Standards/11ac/DraftP802.11ac_D4.1.pdf) by downclocking the operations by a factor of 10 (or by "10×").

For example, for small battery-powered sensor type of devices or stations (STAs), the system clock speed of an 802.11ah-based STA may be downclocked by 10× so that power consumption and cost of the STA may be reduced. Such downclocking, however, may result in an increase by 10× of a received packet processing delay time (aRxPLCP-Delay). Accordingly, a time duration associated with a short interframe space (SIFS), i.e., the time interval between receiving a data frame at a STA and transmitting an acknowledgement (ACK) frame for the received frame from the STA (e.g., as defined in the IEEE 802.11 specification), may have to be proportionally increased. For instance, due to 10× downclocking in a sensor STA, a typical aRxPLCP-Delay equal to 12.5 µs for 802.11ac 20 MHz mode may jump 10 times to around 125 µs for an 802.11ah-based communication, and similarly, a typical SIFS duration equal to 16 µs for 802.11ac operation may increase to around 160 as for the 802.11ah-based communication.

In other cases, however, e.g., for a relatively high data rate application such as a cellular offloading application throughput related to the media access control (MAC) layer is important and it may be preferable to have a shorter SIFS duration. The SIFS time may be reduced by increasing the speed of the system clock. For example, using 5× downclocking (instead of 10× downclocking), aRxPLCPDelay may be decreased from 125 µS to 62.5 µS, and accordingly, the SIFS time may be shortened to approximately 80 µS. The requirements for a high data rate application of a cellular device is in contrast with the requirements of a small low-power sensor device, which may not need to improve throughput, or to use the double clock speed as that may increase cost and power consumption of the sensor device.

To support the two different types of applications (i.e., high data rate and low data rate) under the IEEE 802.11ah specification, an existing technique proposes two downclocking levels. For example, for channel access operations and for small battery-powered sensor STAs (and its application) operating under the IEEE 802.11ah standard, the system clock may be downclocked 10 times to achieve a SIFS duration that is 10 times higher the IEEE 802.11ac level—this SIFS configuration is referred to as "regular SIFS." Further, for more capable devices such as STAs operating under IEEE 802.11ah standard and implementing or executing a cellular offloading application, the system clock may be downclocked 5 times to achieve a SIFS duration that is 5 times higher the IEEE 802.11ac level—this SIFS configuration is referred to as "short or small SIFS." Accordingly, the small SIFS configuration relates to or defines shorter time duration than a regular SIFS configuration.

This proposed technique, however, requires that the STA receiving data packets or frames from an associated STA or access point (AP) informs the associated STA or AP how fast it can respond to a packet reception with an acknowledgement (ACK) frame, i.e. whether the STA supports the short SIFS for shorter response time or the regular SIFS for a longer response time. Based on this information provided by the STA, the associated STA or AP may set a correct waiting period in which an ACK frame is anticipated (e.g., "ACK-Timeout" value) after which period the STA may begin packet retransmission.

Another shortcoming of the proposed technique is that, under the STA-informed SIFS scheme, one or more third-party STAs, which receive the data packet sent by the AP but do not receive the ACK frame, may not be able to ascertain the time instance or period indicating the end of the packet exchange between the packet-receiving STA and the AP. In some embodiments, the third-party STAs are not able decode the MAC header in the data packet exchanged between the AP and the STA. Due to this ambiguity in terms of the end of the packet exchange, the third-party STAs may (untimely) attempt to access channel, as such resulting in a channel contention scenario.

BRIEF DESCRIPTION OF THE DRAWINGS

FIG. 1A depicts an embodiment of a preamble for establishing communications between wireless communication devices;

FIG. 1B depicts an alternative embodiment of a preamble structure for establishing communications between wireless communication devices;

FIG. 1C depicts an embodiment of a signal field;

DETAILED DESCRIPTION OF EMBODIMENTS

Figure 1:
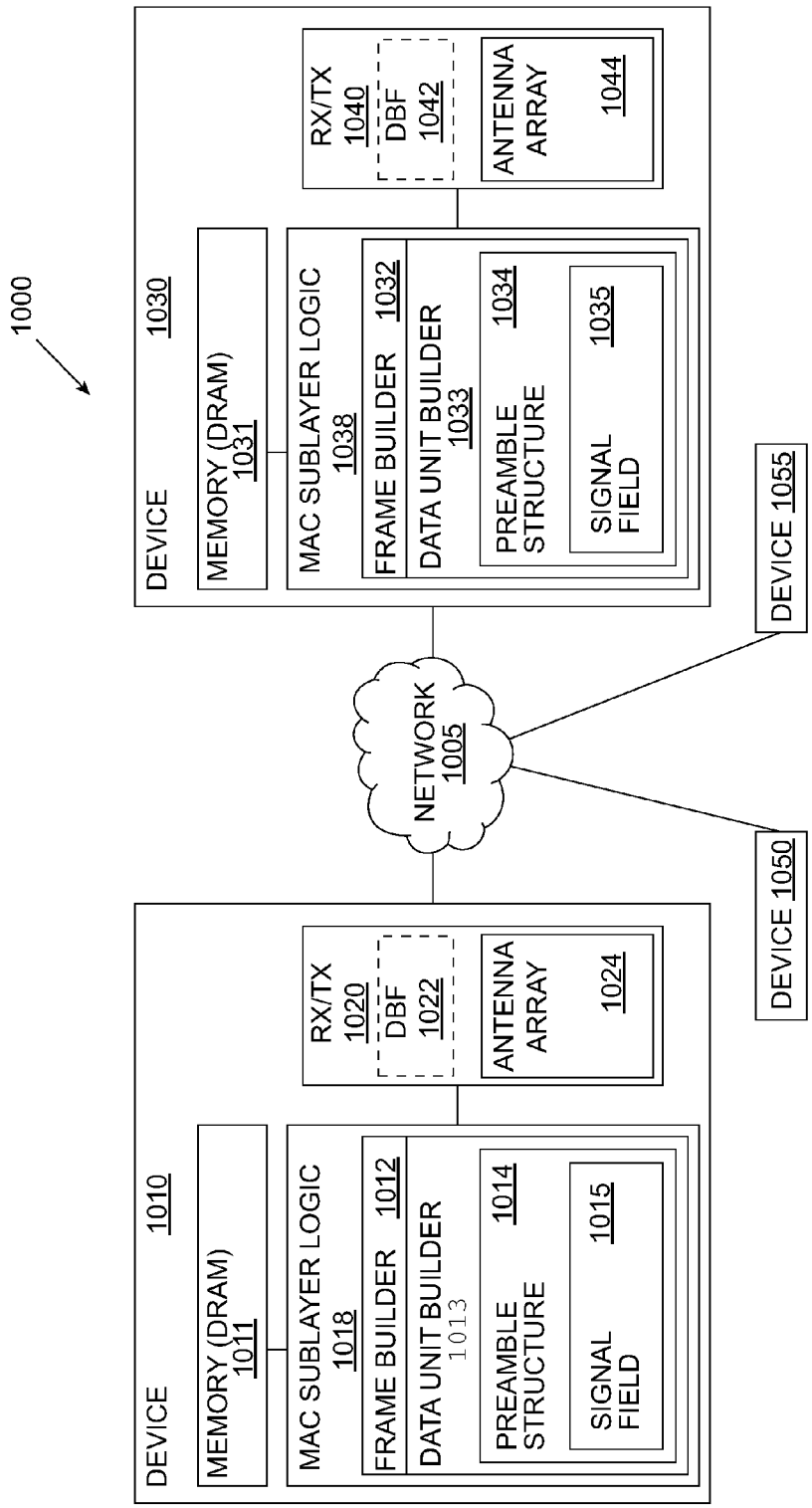
FIG. 1 depicts an embodiment of an example wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, embodiments to enable, indicate and detect Short Interframe Space (SIFS) of different time durations, a short (or small) SIFS which is shorter in duration than a regular SIFS, are described herein. Embodiments may comprise logic such as hardware and/or code to signal a short SIFS or a regular SIFS by setting or clearing a bit of a management frame transmitted by a station to an access point during the network association process, or by setting or clearing a bit in the SIG field of the preamble of a data unit transmitted by an access point to an associated station. In some embodiments, a third party station is able to receive the data unit sent by the access point, and detect the SIG field bit to determine whether the short SIFS duration or regular SIFS duration is defined for the communication between the access point and the station.

In some embodiments, one or more of the techniques described herein are used to provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

In some embodiments, devices and/or systems implementing the techniques described herein reuse the IEEE 802.11n/ac specification features with new features that meet these lower data rate and ultra low power consumption requirements to reuse hardware implementations and to reduce implementation costs. In some embodiments, the new preamble structure (e.g., of the IEEE 802.11ah specification) uses a short training field (STF) and a long training field (LTF) from the IEEE 802.11ac and IEEE 802.11ag systems, reducing the cost of implementations. Further embodiments accommodate multiple streams. Several embodiments do not implement legacy training fields and legacy signatures and do not implement multi-user, Multiple Input, Multiple Output (MIMO). And some embodiments employ beamforming.

In the frequency bands of 1 GHz and lower, the available bandwidth is restricted, thus an IEEE 802.11n/ac type system that uses bandwidths of 20, 40, 80 and 160 MHz may not be practicable in some geographic regions. In many embodiments, the systems have bandwidths on the order of approximately 1 to 10 MHz. In several embodiments, an 802.11n/ac type system may be down-clocked to achieve lower bandwidths. For instance, many embodiments are down-clocked by N, such as 20 MHz divided by N, where N could take on values of 2, 4, 8, 10, and 20 (providing 10, 5, 2.5, 2, and 1 MHz bandwidth operation). Further embodiments are downclocked by N, such as 160 MHz divided by N, where N could take on values of 10, 20, 40, 80, and 160 (providing 16, 8, 4, 2, and 1 MHz bandwidth operation). In several embodiments, the bandwidths may also be based on the tone count for those IEEE 802.11ac systems. In some embodiments, the tone counts may be the same as those IEEE 802.11ac systems. In other embodiments, the tone counts may be different from those IEEE 802.11ac systems, removing, for example, tone counts that are not unnecessary at the lower bandwidths.

Embodiments of the preamble structure may implement the new signal field, 11ah-SIG. The preamble structure may define an STF and an LTF to train the antennas for one stream operation, followed by the signal field and the data payload. In some embodiments, the signal field may be preceded by a guard interval (GI) and followed by additional LTFs to accommodate additional multiple input, multiple output (MIMO) streams. Other embodiments do not include the additional LTFs because they communicate via a single stream.

Logic, modules, devices, and interfaces herein described may perform functions that may be implemented in hardware and/or code. Hardware and/or code may include software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf), communications in networks, messaging systems, and smart-devices to facilitate interaction between such devices. Furthermore, some wireless embodiments may incorporate a single antenna while other embodiments may employ multiple antennas.

In accordance with various embodiments of the present disclosure, a method related to wireless communication, e.g., based on a IEEE 802.11 specification, to signal support for small Short Interframe Space (SIFS) configuration is presented. The method may include generating, e.g., at a medium access control sublayer logic module of a first device, a frame including a bit set to a value, the bit value indicating whether the first device supports the small SIFS configuration. The small SIFS configuration may define shorter time duration than a regular SIFS configuration. The frame may include a management frame, and an extended capabilities field of the management frame may include the bit. The value of the bit may be set to 1 to indicate that the first device supports the small SIFS, or set to 0 to indicate that the first device does not support the small SIFS.

The method may further include transmitting a first data unit comprising the frame from the first device to a second device (e.g., an access point of the network) to associate the first device with the second device in a wireless network. The method may also include receiving a second data unit at the first device, and if the value of the bit was set to indicate that the first device supports the small SIFS, an acknowledgement frame for the second data unit may be generated which is transmitted after a time duration associated with the small SIFS. On the other hand, if the value of the bit was set to indicate that the first device does not support the small SIFS, an acknowledgement frame for the second data unit may be generated which is transmitted after a time duration associated with the regular SIFS.

In accordance with various embodiments of the present disclosure, apparatus to signal support for small Short Interframe Space (SIFS) is presented. Such apparatus may include a Medium access control sublayer logic module configured to generate a frame comprising a bit set to a value, wherein the value of the bit indicates whether the apparatus supports the small SIFS configuration. The small SIFS configuration may define shorter time duration than a regular SIFS configuration. The frame may include a management frame, and an extended capabilities field of the management frame may include the bit. The value of the bit may be set to 1 to indicate that the first device supports the small SIFS, or set to 0 to indicate that the first device does not support the small SIFS. The apparatus may also include a transceiver configured to transmit a first data unit comprising the frame to a device (e.g., an access point) to associate the apparatus with the device in a wireless network.

In accordance with various embodiments of the present disclosure, a method to indicate small Short Interframe Space (SIFS) configuration is presented. The method may include determining, using stored information at a first device, whether a second device associated with the first device in a wireless network supports the small SIFS configuration. The small SIFS configuration may define shorter time duration than a regular SIFS configuration. The method may further include generating a first data unit including a field portion having a bit set to a value based on a result of the determining operation. The first data unit may include a preamble structure which includes the field portion, and the field portion includes information related to a plurality of physical layer parameters related to the wireless communication of data units. The first data unit may be transmitted by an antenna of the first device to the second device.

In accordance with various embodiments of the present disclosure, a method to detect small Short Interframe Space (SIFS) is presented. The method may include receiving, at a first device, a data unit transmitted by a second device to a third device, wherein the second and third devices are associated in a wireless network. A field portion of the data unit may be decoded by a processor of the first device to determine whether a bit of the field portion is set to a first value (e.g., value 1) or a second value (e.g., value 0). The first value may indicate that a small SIFS duration is associated with a communication between the second and third devices, and the second value may indicate that a regular SIFS duration is associated with a communication between the second and third devices, wherein the small SIFS duration is shorter than the regular SIFS duration. The second device may include an access point of the wireless network, and the field portion may include the SIG field of a preamble of the data unit.

Turning now to FIG. 1, there is shown an embodiment of a wireless communication system 1000. The wireless communication system 1000 includes a communications device 1010 that is wire line or wirelessly connected to a network 1005. The communications device 1010 may communicate wirelessly with a plurality of communication devices 1030, 1050, and 1055 via the network 1005. The communications devices 1010, 1030, 1050, and 1055 may include sensors, stations, access points, hubs, switches, routers, computers, laptops, notebooks, cellular phones, PDAs (Personal Digital Assistants), or other wireless-capable devices. Thus, communications devices may be mobile or fixed. For example, the communications device 1010 may include a metering substation for water consumption within a neighborhood of homes. Each of the homes within the neighborhood may include a communications device such as the communications device 1030 and the communications device 1030 may be integrated with or coupled to a water meter usage meter. Periodically, the communications device 1030 may initiate communications with the metering substation to transmit data related to water usage. Furthermore, the metering station or other communications device may periodically initiate communications with the communications device 1030 to, e.g., update firmware of the communications device 1030. In other embodiments, the communications device 1030 may only respond to communications and may not include logic that initiates communications.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 include memory 1011 and 1031, and Media Access Control (MAC) sublayer logic 1018 and 1038, respectively. The memory 1011, 1031 such as Dynamic Random Access Memory (DRAM) may store the frames, preambles, and preamble structures 1014 and 1034, or portions thereof. The frames (also referred to as MAC layer Protocol Data Units (MP- DUs)), and the preamble structures 1014 and 1034 may establish and maintain synchronized communications between the transmitting device and the receiving device. The preamble structures 1014 and 1034 may also establish the communications format and rate. In particular, preambles generated or determined based upon the preamble structures 1014 and 1034 may train, e.g., the antenna arrays 1024 and 1044 to communicate with each other, establish the modulation and coding scheme of the communications, the bandwidth or bandwidths of the communications, the length of the transmission vector (TXvector), the application of beamforming, and the like.

The MAC sublayer logic 1018, 1038 may generate the frames and physical layer data units (PPDUs). More specifically, the frame builders 1012 and 1032 may generate frames and the data unit builders 1013 and 1033 may generate PPDUs. The data unit builders 1013 and 1033 may generate PPDUs by encapsulating payloads comprising the frames generated by frame builders 1012 and 1032. In the present embodiment, the data unit builders 1013 and 1033 may encapsulate the frames with preambles based upon preamble structures 1014 and 1034, respectively, to prefix the payloads to be transmitted over one or more RF channels. The function of a data unit builder, such as the data unit builder 1013 or 1033, is to assemble groups of bits into code words or symbols that make up the preambles as well as the payloads so the symbols can be converted into signals to transmit via antenna arrays 1024 and 1044, respectively.

Each data unit builder 1013, 1031 may supply a preamble structure 1014, 1034 including a signal field portion 1015, 1035, and store the preambles generated based upon the preamble structure 1014, 1034 in the memory 1011, 1031, while the preambles are being generated and/or after the preambles are generated. In the present embodiment, the preamble structure 1014, 1034 includes one short training field (STF) and one long training field (LTF) prior to the signal field 1015, 1035 and the data payload. The STF and the LTF may train the antenna arrays 1022 and 1042 to communicate with each other by making measurements related to communications such as measurements related to relative frequency, amplitude, and phase variations between quadrature signals. In particular, the STF may be used for packet detection, automatic gain control, and coarse frequency estimation. The LTF may be used for channel estimation, timing, and fine frequency estimation for a spatial channel.

In some embodiments, the signal field 1015, 1035 provides information related to physical layer parameters used for or to establish wireless communication of the data unit. Such physical layer parameters may include parameters representing modulation and coding scheme (MCS), bandwidth, length, beamforming, space time block coding (STBC), coding, aggregation, short guard interval (Short GI), cyclic redundancy check (CRC), and a tail. The CRC field may include a four-bit cyclic redundancy check sequence providing a Hamming distance of one or two.

In some embodiments, the signal field 1015, 1035 may include an MCS including Binary Phase-Shift Keying (BPSK) with a coding rate of 1/2 or a 256-point constellation, Quadrature Amplitude Modulation (256-QAM) with a coding rate of 3/4. In further embodiments, the signal field 1015, 1035 includes a modulation technique such as Staggered-Quadrature, Phase-Shift Keying (SQPSK). In many embodiments, the MCS establishes communication with 1 to 4 spatial streams.

In several embodiments, the signal field 1015, 1035 may include bandwidths including 20 Megahertz (MHz) divided by N, 40 MHz divided by N, 80 MHz divided by N, or 160 MHz divided by N, wherein N is an integer and the bandwidths fall between 1 and 10 MHz. For example, bandwidths may include 160 MHz divided by N, wherein N equals 160, 80, 40, 20, and 10, which results in bandwidths of 1 MHz, 2 MHz, 4 MHz, 8 MHz, and 16 MHz. In further embodiments, bandwidths may include 20 MHz divided by N, wherein N equals 2, 4, 8, 10, 16, and 20, which results in bandwidths of 1 MHz, 1.25 MHz, 2 MHz, 2.5 MHz, 5 MHz, and 10 MHz The communications devices 1010, 1030, 1050, and 1055 may each include a transceiver (RX/TX) such as transceivers (RX/TX) 1020 and 1040. Each transceiver 1020, 1040 includes an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 include a receiver and/or a transmitter with a single antenna including a Single-Input, Single Output (SISO) system, a Single-Input, Multiple Output (SIMO) system, and a Multiple-Input, Single Output (MISO) system. The wireless communication system 1000 of FIG. 1 is intended to represent an Institute for Electrical and Electronics Engineers (IEEE) 802.11ah system. Similarly, devices 1010, 1030, 1050, and 1055 are intended to represent IEEE 802.11ah devices.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the STF and LTF symbols during transmission to avoid inter-symbol interference (ISI), which might result from multi-path distortion. These guard tones also help the signal conform to a spectral mask. The nulling of the direct component (DC) may be used to simplify direct conversion receiver designs.

In one embodiment, the communications device 1010 optionally includes a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 includes a transceiver 1040 to receive and transmit signals from and to the communications device 1010. The transceiver 1040 may include an antenna array 1044 and, optionally, a DBF 1042. In parallel with Digital Beam Forming, the transceiver 1040 is capable of communicating with IEEE 802.11ah devices.

FIG. 1A depicts an embodiment of a physical layer protocol data unit (PPDU) 1060 with a preamble structure 1062 for establishing communications between wireless communication devices such as communications devices 1010, 1030, 1050, and 1055 in FIG. 1. The PPDU 1060 may include a preamble structure 1062 including Orthogonal Frequency Division Multiplexing (OFDM) training symbols for a single Multiple Input, Multiple Output (MIMO) stream followed by a signal field, followed by additional OFDM training symbols for additional MIMO streams, and the preamble structure 1060 may be followed by the data payload. In particular, the PPDU 1060 may include a short training field (STF) 1064, a long training field (LTF) 1066, the 11AH-SIG 1068, additional LTFs 1069, and data 1070. The STF 1064 may include a number of short training symbols such as 10 short training symbols that are 0.8 microseconds (μs) times N in length, wherein N is an integer representing the down-clocking factor from a 20 MHz channel spacing. For instance, the timing would double for 10 MHz channel spacing. The total time frame for the STF 1064 at a 20 MHz channel spacing is 8 μs times N.

The LTF 1066 may include a guard interval (GI) symbol and two long training symbols. The guard interval symbol may have a duration of 1.6 μs times N and each of the long training symbols may have durations of 3.2 μs times N at the 20 MHz channel spacing. The total time frame for the LTF 1066 at a 20 MHz channel spacing is 8 μs times N.

The 11ah-SIG 1068 may include a GI symbol at 0.8 μs times N and signal field symbols at 7.2 μs times N such as the symbols described in FIG. 1C. The additional LTFs 1069 may include one or more LTF symbols for additional MIMO streams if needed at 4 μS times N at 20 MHz channel spacing. The data 1070 may include one or more MAC sublayer protocol data units (MPDUs) and may include one or more GIs. For example, data 1070 may include one or more sets of symbols including a GI symbol at 0.8 μs times N at the 20 MHz channel spacing followed by payload data at 3.2 μs times N at the 20 MHz channel spacing.

The present embodiment may include five allowed bandwidths such as 1 MHz, 2 MHz, 4 MHz, 8 MHz and 16 MHz. In some embodiments, the preamble generated in accordance with the preamble structure 1062 may be replicated into, e.g., two bandwidths such as two 1 MHz bandwidths. Once the data portion starts, replication may no longer occur and new tone allocations may be implemented. For instance, the tone allocation for the preamble may be fixed at 56 tones for the lowest bandwidth (1 MHz), may be replicated to get a total of 112 tones for the next bandwidth (2 MHz), may be replicated for a total of 224 tones for the next bandwidth (4 MHz), may be replicated again for a total of 448 tones for the next bandwidth (8 MHz), and may be replicated again for a total of 896 tones for the largest bandwidth (16 MHz). The tone allocation for the data 1070 may be set at 56 tones (52 data tones plus 4 pilot tones) for a 1 MHz bandwidth, 114 tones (108 tones for the data plus 6 pilot tones) for a 2 MHz bandwidth, 242 tones (234 data tones plus 8 pilot tones) for a 4 MHz bandwidth, 484 tones (468 tones for the data plus 16 pilot tones) for a 8 MHz bandwidth, and 968 tones (936 tones for the data plus 32 pilot tones) for a 16 MHz bandwidth.

FIG. 1B depicts an alternative embodiment of a physical layer protocol data unit (PPDU) 1080 with a preamble structure 1082 for establishing communications between wireless communication devices such as communications devices 1010, 1030, 1050, and 1055 in FIG. 1. The PPDU 1080 may include a preamble structure 1082 including Orthogonal Frequency Division Multiplexing (OFDM) training symbols for a single Multiple Input, Multiple Output (MIMO) stream followed by a signal field, and the data payload may follow the preamble structure 1080. In particular, the PPDU 1080 may include a short training field (STF) 1064, a long training field (LTF) 1066, the 11AH-SIG 1068, and data 1070.

FIG. 1C depicts an embodiment of a signal field, 11AH-SIG 1100 for establishing communications between wireless communication devices such as communications devices 1010, 1030, 1050, and 1055 in FIG. 1. While the number, types, and content of the fields may differ between embodiments, the present embodiment may include a signal field with a sequence of bits for a modulation and coding scheme (MCS) 1104 parameter, a bandwidth (BW) 1106 parameter, a length 1108 parameter, a beamforming (BF) 1110 parameter, a space-time block coding (STBC) 1112 parameter, a coding 1114 parameter, an aggregation 1116 parameter, a short guard interval (SGI) 1118 parameter, a cyclic redundancy check (CRC) 1120 parameter, and a tail 1122 parameter. The signal field may also include one or more bits (e.g., two ACK bits) for indicating whether there is an acknowledgement packet (ACK) following a particular packet. The signal field may further include one or more reserved bits (e.g., four reserved bits).

The MCS 1104 parameter may include six bits and may designate binary phase-shift keying (BPSK), 256-point constellation quadrature amplitude modulation (256-QAM), or staggered quadrature phase-shift keying (SQPSK) as a modulation format for a communication. The selections may offer one to four spatial streams for the communication. The BPSK may have a coding rate of 1/2. The 256-QAM may have a coding rate of 3/4. And the SQPSK, also referred to as OQPSK, may have a coding rate of 1/2 or 3/4. In some embodiments, SQPSK is an allowed modulation format on the signal and data fields to extend the range of operation of the communications devices for, e.g., outdoor sensor monitoring.

The BW 1106 parameter may include two bits and may involve selecting a bandwidth from four bandwidths such as 2 MHz, 4 MHz, 8 MHz, and 16 MHz. Selection of a fifth bandwidth such as 1 MHz may also be selected via another method. In other embodiments, the BW 1106 parameter may offer four different bandwidths that are down-clocked by an integer N from 20 MHz, 40 MHz, 80 MHz, or 160 MHz. The number N may be any integer such as 1, 2, 3, 4, 5, 6, 7, 8, 9, 10, and so on.

The length 1108 parameter may include 16 bits and may describe the length of the transmit vector in octets. In some embodiments, the allowed values for the length 1108 parameter are in the range of 1 to 4095. The length 1108 parameter may indicate the number of octets in the MAC Protocol Data Unit (MPDU) that the MAC sublayer logic is currently requesting the physical layer (PHY) device, e.g., the transceiver 1020, 1040 in FIG. 1, to transmit. The length 1108 parameter is used by the PHY to determine the number of octet transfers that will occur between the MAC and the PHY after receiving a request to start the transmission.

The beamforming (BF) 1110 parameter may include one bit and may designate whether the PHY will implement beamforming for transmission of the MPDU. The space-time block coding (STBC) 1112 parameter may include one bit and may designate whether or not to implement a space-time block coding such as Alamouti's code. And the coding 1114 parameter may include two bits and may designate whether to use binary convolutional coding (BCC) or low density parity check coding (LDPC).

The aggregation 1116 parameter may include one bit and may designate whether or not to mandate MPDU aggregation (A-MPDU). The short guard interval (SGI) 1118 parameter may include one or two bits and may designate the duration of the SGI. For example, one bit may be set to a logical one to designate a short guard interval or set to a logical zero to designate a long guard interval and the second bit may designate short guard interval length ambiguity mitigation.

The cyclic redundancy check (CRC) 1120 sequence parameter may include a four-bit CRC sequence of the signal field, 11ah-SIG 1100, the CRC providing a Hamming distance of one or two. In some embodiments, to achieve a Hamming distance of two, the four-bit CRC sequence is generated with a generator polynomial of $x^4+x+1$, or through concatenation of four one-bit CRCs (parity bits) in which every $4^{th}$ bit of the 11ah-SIG 1100 field is an input to one of the parity bit calculations.

The tail 1122 parameter may include a six bit sequence of, e.g., logical zeros or ones, to designate the end of the signal field, 11ah-SIG 1100.

Figure 2:
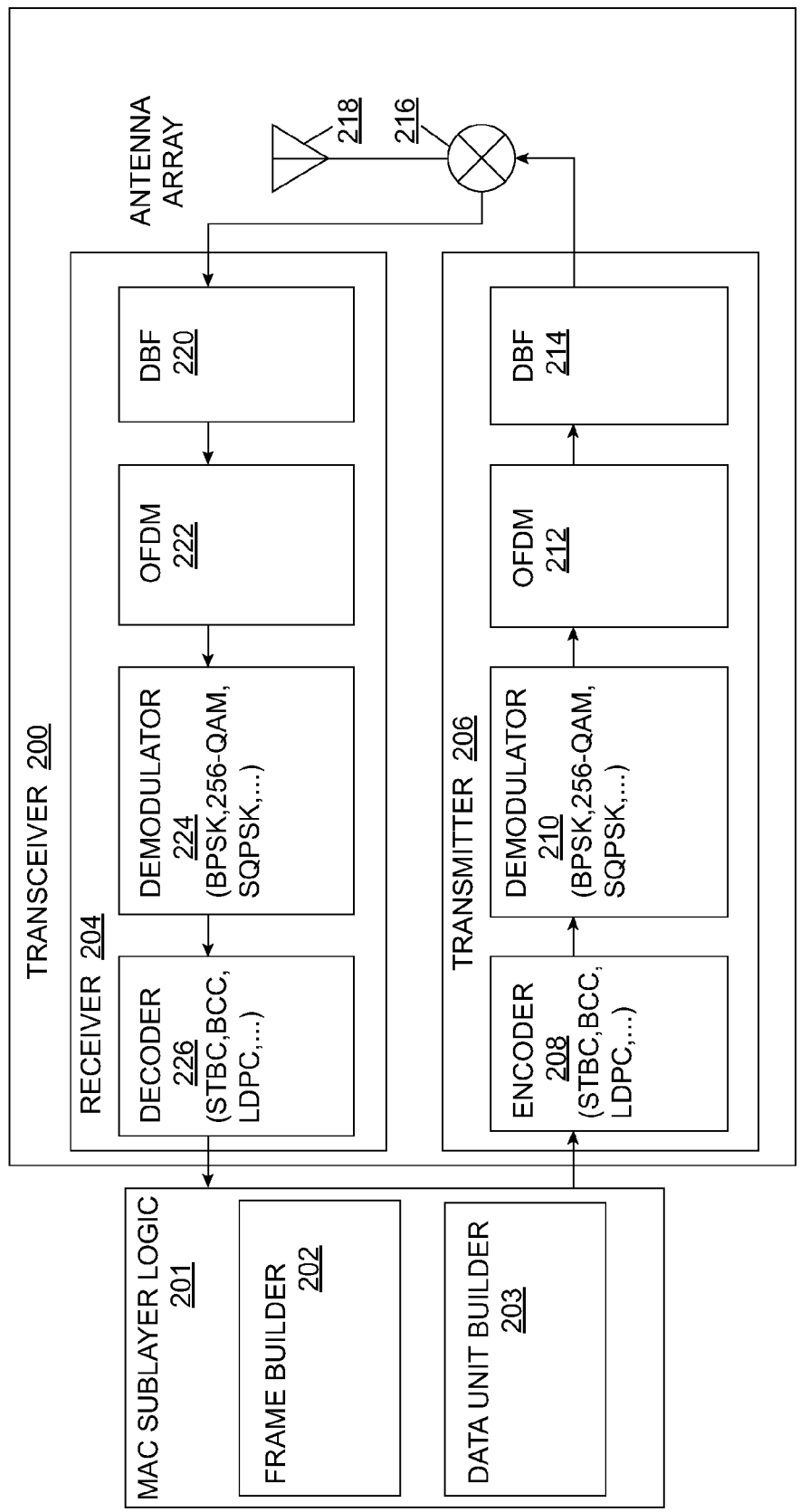
FIG. 2 depicts an embodiment of an apparatus to generate and transmit an Orthogonal Frequency Division Multiplexing (OFDM)-based communication in a wireless network.

FIG. 2 illustrates an embodiment of an apparatus to transmit an Orthogonal Frequency Division Multiplexing (OFDM)-based communication in a wireless network. The apparatus includes a transceiver 200 coupled with Medium Access Control (MAC) sublayer logic 201. The MAC sublayer logic 201 may generate a physical layer protocol data unit (PPDU) to transmit via transceiver 200.

The MAC sublayer logic 201 may include hardware and/or code to implement data link layer functionality including generation of MAC protocol data units (MPDUs) from MAC service data units (MSDUs) by encapsulating the MSDUs in frames via a frame builder 202. For example, a frame builder may generate a frame including a type field that specifies whether the frame is a management, control or data frame and a subtype field to specify the function of the frame. A control frame may include a Ready-To-Send or Clear-To-Send frame. A management frame may include a Beacon, Probe Response, Association Response, and Reassociation Response frame type. The management frame, as is typical in the IEEE 802.11 specification, may include one or more bits defining fields including a capability information field, and one or more bits defining information elements including extended capabilities field (which extends the capability information field). The duration field that follows the first frame control field specifies the duration of this transmission. And the data type frame is designed to transmit data. An address field may follow the duration field, specifying the address of the intended receiver or receivers for the transmission.

The MAC sublayer logic 201 may also include a data unit builder 203. The data unit builder 203 may determine a preamble based upon a preamble structure such as the preamble structure illustrated in FIG. 1C to encapsulate the MPDU to generate a PPDU. In many embodiments, the data unit builder 203 may select a preamble from memory such as a default preamble for data frame transmissions, control frame transmissions, or management transmissions. In several embodiments, the data unit builder 203 may create the preamble based upon a default set of values for the preamble received from another communications device. For example, a data collection station compliant with IEEE 802.11ah for a frame may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a CTS or the like. In other embodiments, the sensor may transmit data to the data collection station (or an access point) in response to initiation of communications by the data collection station (or the access point).

The data unit builder 203 may generate the preamble including an STF, a guard interval, an LTF, and an 11ah-SIG field. In many embodiments, the data unit builder 203 may create the preamble based upon communications parameters chosen through interaction with another communications device. The data unit builder 203 may create the preamble with the 11ah-SIG field comprising an MCS field having six bits indicative of Binary Phase-Shift Keying with a coding rate of 1/2 and four spatial streams. The data unit builder 203 may determine a bandwidth from five allowed bandwidths such as 16 MHz, 8 MHz, 4 MHz, 2 MHz, and 1 MHz. In further embodiments wherein the bandwidths fall within 1 MHz to 10 MHz, four of the bandwidths may include sets of bandwidths such as 10 MHz, 6.7 MHz, 5 MHz, and 4 MHz; 10 MHz, 5 MHz, 4 MHz, and 2.5 MHz; 10 MHz, 5 MHz, 2.5 MHz, and 1.25 MHz; 5 MHz, 4 MHz, 3.3 MHz and 2.9 MHz, or the like. In other embodiments, sets of four bandwidths may include one or more bandwidths that are greater than 10 MHz such as 20 MHz, 10 MHz, 5 MHz, and 2.5 MHz; 40 MHz, 20 MHz, 10 MHz, and 5 MHz; 40 MHz, 20 MHz, 10 MHz, and 5 MHz; 26.7 MHz, 20 MHz, 16 MHz, and 13.3 MHz; or the like. The data unit builder 203 may set the BW bits to values representative of one of the four bandwidths of 10 MHz, 5 MHz, 2.5 MHz, and 1.25 MHz. And in many embodiments, a fifth bandwidth may be selected by another means within the 11ah-SIG field such as a bandwidth parameter with a third bit, an extended data payload with one or more bits that indicate the fifth bandwidth, a setting of another bit within the 11ah-SIG field in conjunction with an indication of the bandwidth parameter being set to a particular bandwidth, or the like.

In many embodiments, the data unit builder 203 may create the preamble with the 11ah-SIG field comprising a length field that is 16 bits long with, the least significant bit (LSB) first. The length field may include the length of the transmit vector (TXVECTOR). In further embodiments, the data unit builder 203 may create a preamble with the 11ah-SIG field comprising a coding bit to select low density parity check (LDPC) and an extra coding bit to offer LDPC duration ambiguity. The data unit builder 203 may create the preamble with the 11ah-SIG field comprising a bit for transmit beamforming (TxBF). For example, some embodiments may set the TxBF bit to a logical one to indicate that the transmission should be beamformed for data packets to communications devices that have beamforming capabilities and may set the TxBF bit to a logical zero to indicate that the transmission should not be beamformed for, e.g., protection mechanism frames.

In several embodiments, the data unit builder 203 may create the preamble with the 11ah-SIG field comprising a short guard interval (SGI) field, which may be, e.g., 1.6 microseconds (µs) times N, wherein N is the integer by which the timing is down-clocked from 20 MHz channel spacing. The data unit builder 203 may also create the preamble with the 11ah-SIG field comprising a cyclic redundancy check (CRC) field for error detection. (e.g., a four-bit CRC), and a tail comprising, e.g., six zero bits to enable decoding of, e.g., the MCS and length fields immediately after the reception of the tail bits.

In some embodiments, the data unit builder 203 may allocate tones for the preamble based upon IEEE 802.11n/ac tone allocations. For example, 56 tones may be allocated for the preamble for the 1.25 MHz bandwidth, 112 tones may be allocated for the 2.5 MHz bandwidth, 224 tones may be allocated for the 5 MHz bandwidth, and 448 tones may be allocated for the 10 MHz bandwidth. In many embodiments, the data unit builder 203 may allocate tones differently for the data or MPDU portion of the PPDU. For instance, 56 tones may be allocated for the data at the 1.25 MHz bandwidth, 114 tones may be allocated for the data at the 2.5 MHz bandwidth, 242 tones may be allocated for the data at the 5 MHz bandwidth, and 484 tones may be allocated for the data at the 10 MHz bandwidth.

The transceiver 200 includes a receiver 204 and a transmitter 206. The transmitter 206 may include one or more of an encoder 208, a modulator 210, an OFDM 212, and a DBF 214. The encoder 208 of transmitter 206 receives data destined for transmission from the MAC sublayer logic 202. The MAC sublayer logic 202 may present data to transceiver 200 in blocks or symbols such as bytes of data. The encoder 208 may encode the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also include encryption for security.

In the present embodiment, the encoder 208 may implement a space-time block coding (STBC) and a binary convolutional coding (BCC) or a low density parity check coding (LDPC), as well as other encodings.

The modulator 210 of transmitter 206 receives data from encoder 208. A purpose of modulator 210 is to transform each block of binary data received from encoder 208 into a unique continuous-time waveform that can be transmitted by an antenna upon up-conversion and amplification. The modulator 210 impresses the received data blocks onto a sinusoid of a selected frequency. More specifically, the modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

In one embodiment, the modulator 210 may implement Quadrature Amplitude Modulation (QAM) impressing two separate k-bit symbols from the information sequence onto two quadrature carriers, $\cos(2\pi ft)$ and $\sin(2\pi ft)$. QAM conveys two digital bit streams, by changing (modulating) the amplitudes of two carrier waves, using the amplitude-shift keying (ASK) digital modulation scheme. The two carrier waves are out of phase with each other by 90° and are thus called quadrature carriers or quadrature components. The modulated waves are summed, and the resulting waveform is a combination of both phase-shift keying (PSK) and amplitude-shift keying (ASK). A finite number of at least two phases and at least two amplitudes may be used.

In another embodiment, the modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta=2\pi(n-1)/n$ for n a positive integer less than or equal to N. A resulting equivalent low pass signal may be represented as $$u(t) = \sum_{n=0}^{\infty} e^{j\theta_n} g(t - nT)$$

where $g(t-nT)$ is a basic pulse whose shape may be optimized to increase the probability of accurate detection at a receiver by, for example, reducing inter-symbol interference. Such embodiments may use Binary Phase-Shift Keying (BPSK), the simplest form of phase-shift keying (PSK). BPSK uses two phases which are separated by 180° and is the most robust of all the PSKs since it takes the highest level of noise or distortion to make the demodulator reach an incorrect decision. In BPSK, there are two states for the signal phase: 0 and 180 degrees. The data is often differentially encoded prior to modulation.

In yet another embodiment, the modulator 210 maps the blocks of data received from encoder 208 alternately on two channels or streams called the I channel (for "in phase") and the Q channel ("phase quadrature"), which is referred to as staggered quadrature phase-shift keying (SQPSK). SQPSK is a method of phase-shift keying in which the signal carrier-wave phase transition is 90 degrees or ¼ cycle at a time. A phase shift of 90 degrees is known as phase quadrature. A single-phase transition does not exceed 90 degrees. In SQPSK, there are four states: 0, +90, −90 and 180 degrees.

The output of modulator 210 may be up-converted to a higher carrying frequency. Or, modulation may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \frac{1}{2}[\sin(A+B) + \sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The output of modulator 210 is fed to an Orthogonal Frequency Division Multiplexer (OFDM) 212. OFDM 212 impresses the modulated data from modulator 210 onto a plurality of orthogonal sub-carriers. The output of the OFDM 212 is fed to the Digital Beam Former (DBF) 214. Digital beam forming techniques are employed to increase the efficiency and capacity of a wireless system. Generally, digital beam forming uses digital signal processing algorithms that operate on the signals received by, and transmitted from, an array of antenna elements to achieve enhanced system performance. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The transceiver 200 may also include diplexers 216 connected to antenna array 218. Thus, in this embodiment, a single antenna array is used for both transmission and reception. When transmitting, the signal passes through diplexers 216 and drives the antenna with the up-converted information-bearing signal, x. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using printed circuit board metallization technology. Microstrips, striplines, slotlines, and patches, for example, are all candidates for the antenna array 218.

The transceiver 200 may include a receiver 204 for receiving, demodulating, and decoding information bearing signals. The receiver 204 may include one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals.

The output of the DBF 220 is fed to the OFDM 222. The OFDM 222 extracts signal information from the plurality of subcarriers onto which information-bearing signals are modulated.

The demodulator 224 demodulates the received signal. Demodulation is the process of extracting information from the received signal to produce an un-demodulated information signal. The method of demodulation depends on the method by which the information is modulated onto the received carrier signal. Thus, for example, if the modulation is BPSK, demodulation involves phase detection to convert phase information to a binary sequence. Demodulation provides to the decoder a sequence of bits of information. The decoder 226 decodes the received data from the demodulator 224 and transmits the decoded information, the MPDU, to the MAC sublayer logic 202.

Persons of skill in the art will recognize that a transceiver may include numerous additional functions not shown in FIG. 2 and that the receiver 204 and transmitter 206 can be distinct devices rather than being packaged as one transceiver. For instance, embodiments of a transceiver may include a Dynamic Random Access Memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing.

Figure 3A:
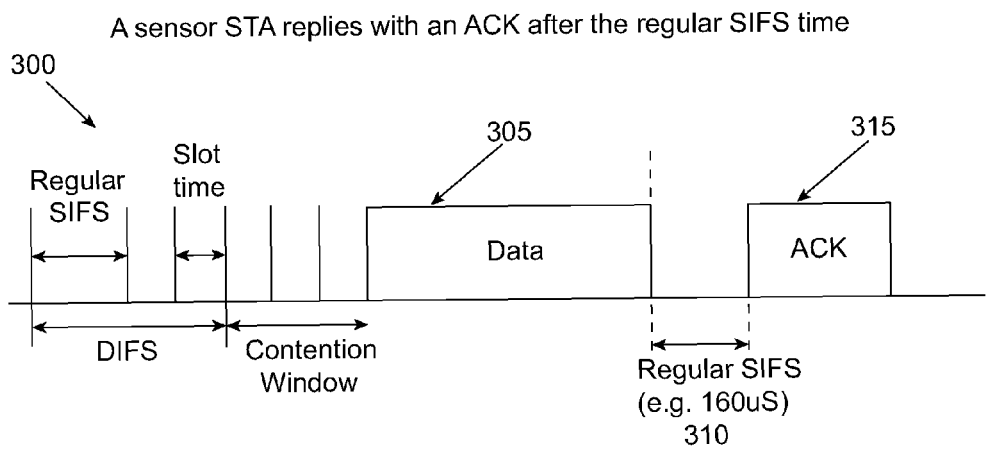
FIG. 3a, 3b depict packet exchanges based on regular and short SIFS configuration.
Figure 3B:
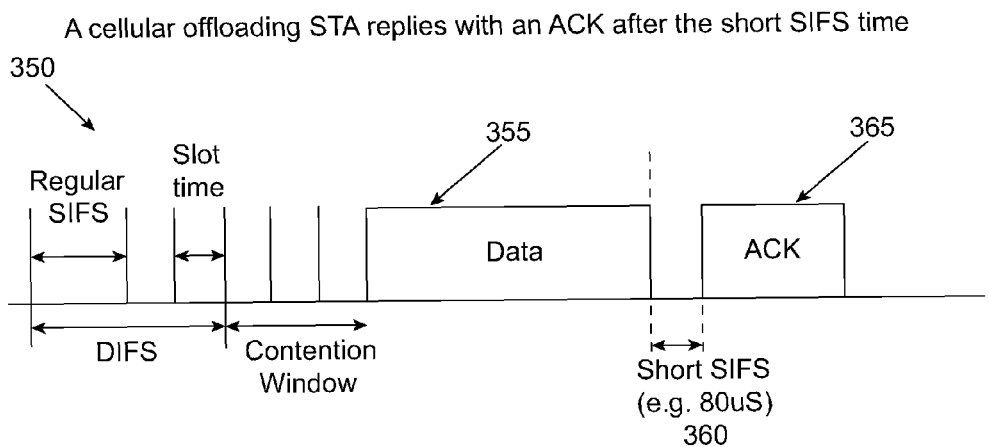

Referring now to FIGS. 3a, 3b which illustrate various timings related to a packet exchange at a STA (e.g., device 1030), according to an existing technique to use different SIFS configurations at the STA. In particular, FIG. 3a illustrates a timing diagram 300 at a low-powered sensor STA which is arranged with the regular SIFS configuration. As shown, upon receiving a data packet 305 (e.g., from an access point (AP) 1010), the sensor STA waits for a time interval 310 associated with the regular SIFS configuration, e.g., 160 µs, and after the interval 310, generates and transmits an acknowledgement packet (ACK) 315 in response to the received packet 305.

Similarly, FIG. 3b illustrates a timing diagram 350 at a cellular offloading STA which is arranged with the short or small SIFS configuration. As shown, upon receiving a data packet 355 (e.g., from an access point (AP) 1010), the cellular offloading STA waits for a time interval 360 associated with the short SIFS configuration, e.g., 80 µs, and after the interval 360, generates and transmits an acknowledgement packet (ACK) 365 in response to the received packet 355.

As previously discussed, there are two issues with this technique in which, e.g., based on the type of the STA, the SIFS used by the STA is pre-configured. First, this technique requires that the STA (e.g., sensor STA or cellular STA) receiving data packets informs the associated STA or AP how fast it can respond to a packet reception with an ACK frame, i.e. whether the STA supports the short SIFS for shorter response time or the regular SIFS for a longer response time. Based on this information provided by the STA, the associated STA or AP may set a correct waiting period in which an ACK frame is anticipated (e.g., "ACK-Timeout" value) after which period the STA may begin packet retransmission. Second, in this technique, one or more third-party STAs, which receive the data packet sent by the AP but do not receive the ACK frame, may not be able to ascertain the time instance or period indicating the end of the packet exchange, e.g., between the packet-receiving STA and the AP. The third-party STAs may also not be able decode the MAC header in the data packet exchanged between the AP and the STA. Due to this ambiguity in terms of the end of the packet exchange, the third-party STAs may untimely attempt to access channel, as such resulting in a channel contention scenario.

Figure 4:
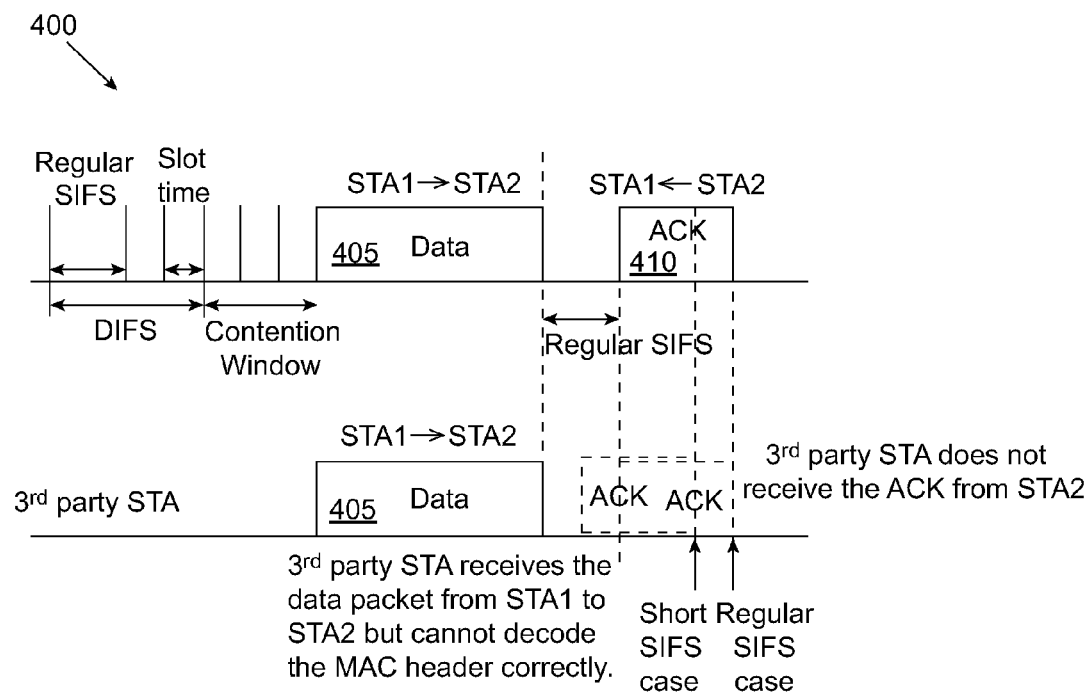
FIG. 4 depicts a packet exchange based on a regular SIFS configuration.

Such scenario with ambiguity at a third-party STA is depicted in FIG. 4. As shown, STA1 (e.g., an AP device 1010) sends a data packet 405 to STA2 (e.g., device 1030). The data packet 405 may also be received by a third-party STA (e.g., device 1050), which may not be able to decode the MAC header in the data packet correctly. In one embodiment, STA2 is configured with regular SIFS, and as such, upon receiving the packet 405, generates and sends an ACK packet 410 to STA1 after the time interval defined for the regular SIFS configuration (e.g., 160 µs). In some embodiments, receipt of the ACK 410 at STA1 marks the completion of a packet exchange. The third-party STA, however, may not receive ACK 410 from STA2, and as such, is unaware of whether STA2 is supposed to respond to the packet 405 with ACK 410 after the short SIFS interval or the regular SIFS interval. Accordingly, the third-party STA may not be able to determine at which point in time the packet exchange between STA1 and STA2 has ended, after which the channel is available to the third-party STA.

To address the foregoing problems, in accordance with various embodiments of the present disclosure, two additional signaling bits are defined, which are set (and/or cleared) to a particular value by a STA device and an AP device. In some embodiments, one signaling bit, "short SIFS support" bit, is defined in the 802.11 extended capabilities element of the management frame exchanged between wireless devices (AP device 1010 and STA device 1030) during the initial association process in the IEEE 802.11-based wireless network.

Accordingly, during the association process with an AP device, a STA device (e.g., a sensor or cellular STA) may generate (e.g., using its MAC sublayer logic) a management frame including the extended capabilities field which has the short SIFS support bit set to a particular value to indicate whether the STA device supports the small SIFS configuration. For example, the STA device may set the short SIFS support bit to value 1 to indicate that the STA device supports the small SIFS, and to value 0 to indicate that the STA device does not support the small SIFS (and therefore, supports the regular SIFS configuration). The STA device may then transmit a data unit including the management frame to the AP device. The data unit may be prepared by encapsulating the frame with a preamble at the device's data unit builder (as shown and described above with respect to FIG. 1 and FIGS. 1A-1C). In some embodiments, the AP device receives such management frames each with the short SIFS support bit from multiple STA devices of the wireless network, and records and stores information about each STA device's short SIFS configuration in a memory (e.g., memory 1011).

Having the SIFS configuration arranged (using the short SIFS support bit) at the STA device and informed to the AP device, upon receiving a data packet from the AP device, the STA device may generate and transmit an ACK frame to the AP device in response to the received data packet after a time interval as defined by the short SIFS support bit. For instance, if the value of the support bit was set to 1, the ACK is generated and transmitted after a time duration associated with the small SIFS configuration (e.g., 80 μs). Otherwise, if the value of the support bit was set to 0, the ACK is generated and transmitted after a time duration associated with the regular SIFS configuration (e.g., 160 μs). To prepare for transmission, the ACK frame may be encapsulated in a data unit with a preamble at the STA device's data unit builder (as shown and described above with respect to FIG. 1 and FIGS. 1A-1C).

In some embodiments, another signaling bit, "short SIFS" bit, is defined in the signal field (e.g., 11AH-SIG 1100) of the preamble structure (e.g., preamble 1082) of the data packets or units exchanged between wireless devices (AP device 1010 and STA device 1030) in the IEEE 802.11-based wireless network. For instance, the AP device may be configured to set or clear the short SIFS bit in the signal field of the preamble of the data packets transmitted to STA devices. When the preamble is properly decoded, e.g., by a third-party STA, the short SIFS bit indicates a time interval (e.g., short or regular SIFS duration) after which an ACK frame from the STA device in response to a data packet from the AP device is anticipated.

Specifically, in preparation of a data unit to be sent to a STA device with correct short SIFS information, the AP device (or its MAC sublayer logic) may first determine whether the STA device supports the small SIFS configuration. For example, the AP device may retrieve from a memory the information (stored during the association process) regarding the SIFS configuration (as indicated by the short SIFS support bit) of multiple devices, and determine whether the STA device supports the small SIFS or the regular SIFS configuration. Based on that information, the data unit builder of the AP device may prepare the preamble of the data unit by setting, among other parameters, the short SIFS bit in the signal field. For example, the data unit builder may set the value of the short SIFS bit to 1 based on the stored information that the STA device supports the small SIFS configuration, or set the value of the short SIFS bit of to 0 if the stored information indicates that the STA device does not support the small SIFS configuration (and therefore, supports the regular SIFS configuration). The data unit builder may prepare the complete preamble, encapsulate the data frame (e.g., from the frame builder) with the preamble to generate a PPDU, and transmit the PPDU to the STA device using the transceiver.

In some embodiments, by setting or clearing the short SIFS bit in the preamble, the AP device keeps track of the waiting period after which an ACK packet for the originally-transmitted PPDU is expected from the STA device. For example, the AP device may determine whether an ACK packet for the PPDU is received from the STA device after passing of a wait period, i.e., the wait period being equal to short SIFS time duration if the short SIFS bit was set to 1 in the preamble, or equal to regular SIFS time duration if the short SIFS bit was set to 0 in the preamble. If it is determined that the ACK packet is not received from the STA device, the AP device may re-transmit the PPDU to the STA device.

In some embodiments, the PPDU may be received by a third-party STA device (e.g., device 1050), which may be able to decode the signal field (but not the MAC header) of the PPDU to determine the correct expected end time for the packet exchange between the AP device and the STA device. For example, based on the decoding, if the third-party STA device determines that the short SIFS field is set (i.e., value 1) in the preamble, the third-party STA device uses the short SIFS time interval to calculate the end of the packet exchange between the AP and the STA. On the other hand, if the third-party STA device determines that the short SIFS field is cleared (i.e., value 0) in the preamble, the third-party STA device uses the regular SIFS time interval to calculate the end of the packet exchange between the AP and the STA.

Figure 5:
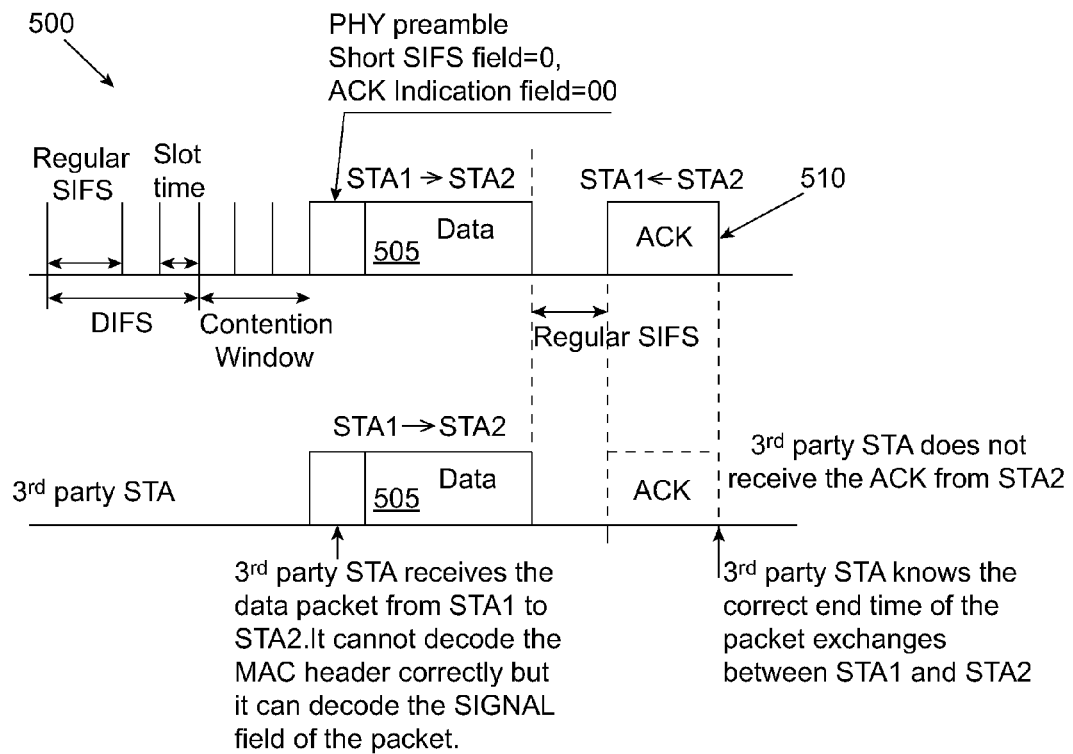
FIG. 5 depicts a packet exchange based on a regular SIFS configuration, in accordance with various embodiments of the present disclosure.

In accordance with the above-described configurations and operations, FIG. 5 illustrates the operation 500 in which the AP device (STA1) transmits a data packet 505 to a regular-SIFS STA device (STA2), and a third-party STA device overhearing only the data packet transmission from STA1 to STA2 is able to deduce from the short SIFS field=0 that the end of the packet exchange between STA1 and STA2 is after the regular SIFS time interval. The ACK Indication field=00 indicates that an ACK frame 510 is following the data packet 505.

Figure 6:
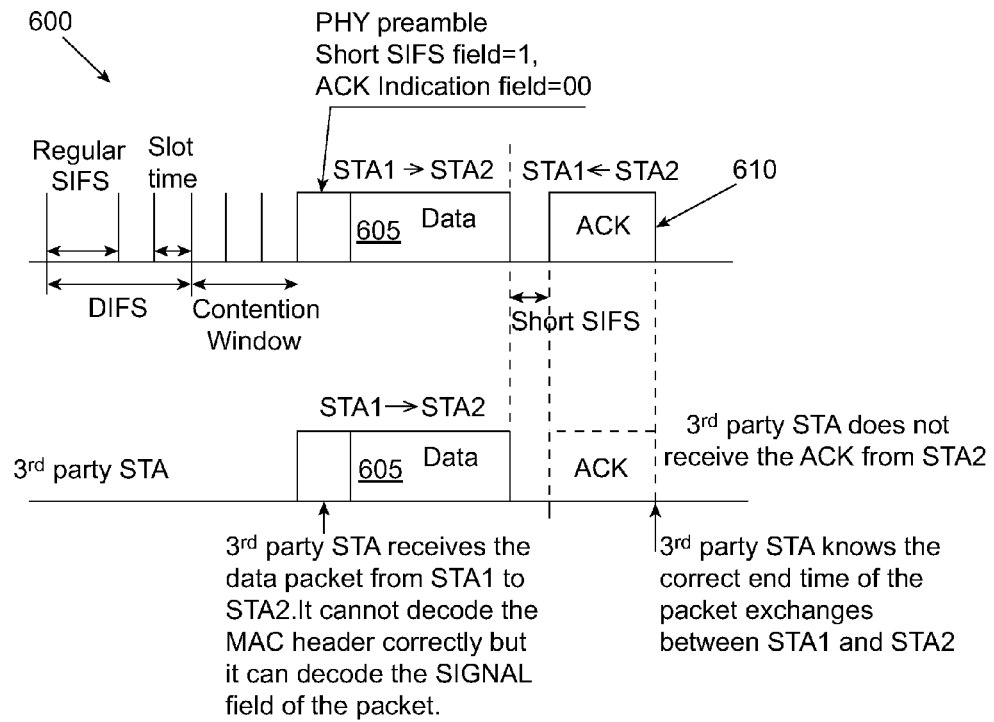
FIG. 6 depicts a packet exchange based on a short SIFS configuration, in accordance with various embodiments of the present disclosure

Similarly, in accordance with the above-described configurations and operations, FIG. 6 illustrates the operation 600 in which the AP device (STA1) transmits a data packet 605 to a short-SIFS STA device (STA2), and a third-party STA device overhearing only the data packet transmission from STA1 to STA2 is able to deduce from the short SIFS field=1 that the end of the packet exchange between STA1 and STA2 is after the short SIFS time interval. The ACK Indication field=00 indicates that an ACK frame 610 is following the data packet 605.

Another embodiment is implemented as a program product for implementing systems and methods described with reference to FIGS. 1-6. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. A method to signal support for small Short Interframe Space (SIFS), the method comprising:
    generating, at a medium access control sublayer logic module of a first device, a frame comprising a bit set to a value, wherein the value of the bit indicates whether the first device supports the small SIFS, wherein the small SIFS defines a shorter time duration than a regular SIFS;
    transmitting, during an association process to associate the first device with a second device in a wireless network, a first data unit comprising the frame including the bit from the first device to the second device;
    after the first device is associated with the second device, receiving a second unit at the first device from the second device; and
    acknowledging receipt of the second data unit in accordance with (a) a time interval associated with the small SIFS if the value of the bit set in the frame indicates that the first device supports the small SIFS, and (b) a time interval associated with the regular SIFS if the value of the bit set in the frame indicates that the first device does not support the small SIFS.

2. The method of claim 1, wherein the frame comprises a management frame, and an extended capabilities field of the management frame comprises the bit.

3. The method of claim 1, wherein the second device comprises an access point of the wireless network.

4. The method of claim 1, further comprising:
    if the value of the bit was set to indicate that the first device supports the small SIFS, generating, at the medium access control sublayer logic module, an acknowledgement frame for the second data unit to be transmitted after a time interval associated with the small SIFS, and
    if the value of the bit was set to indicate that the first device does not support the small SIFS, generating, at the medium access control sublayer logic module, an acknowledgement frame for the second data unit to be transmitted after a time interval associated with the regular SIFS.

5. The method of claim 4, wherein said receiving comprises receiving the second data unit from an access point, the method further comprising:
    encapsulating, by a data unit builder of the first device, the acknowledgement frame with a preamble; and
    transmitting, by an antenna of the first device, the encapsulated acknowledgement frame from the first device to the access point.

6. The method of claim 1, wherein the value of the bit is set to 1 to indicate that the first device supports the small SIFS, or is set to 0 to indicate that the first device does not support the small SIFS.

7. An apparatus to signal support for small Short Interframe Space (SIFS), the apparatus comprising:
    a medium access control sublayer logic module configured to generate a frame comprising a bit set to a value, wherein the value of the bit indicates whether the apparatus supports the small SIFS, wherein the small SIFS defines a shorter time duration than a regular SIFS; and
    a transceiver configured to transmit, during an association process to associate the apparatus with a device in a wireless network, a first data unit comprising the frame including the bit to the device, and after the first device is associated with the second device, receive a second unit from the device,
    wherein the medium access control sublayer logic module is further configured to acknowledge receipt of the second data unit in accordance with (a) a time interval associated with the small SIFS if the value of the bit set in the frame indicates that the first device supports the small SIFS, and (b) a time interval associated with the regular SIFS if the value of the bit set in the frame indicates that the first device does not support the small SIFS.

8. The apparatus of claim 7, wherein the frame comprises a management frame, and an extended capabilities field of the management frame comprises the bit.

9. The apparatus of claim 7, wherein the device comprises an access point of the wireless network.

10. The apparatus of claim 7, wherein the medium access control sublayer logic module is further configured to:
generate an acknowledgement frame for the second data unit to be transmitted after a time interval associated with the small SIFS, if the value of the bit was set to indicate that the apparatus supports the small SIFS, and
generate an acknowledgement frame for the second data unit to be transmitted after a time interval associated with the regular SIFS, if the value of the bit was set to indicate that the apparatus does not support the small SIFS.

11. The apparatus of claim 7, wherein the value of the bit is set to 1 to indicate that the first device supports the small SIFS, or is set to 0 to indicate that the first device does not support the small SIFS.

12. A method to indicate small Short Interframe Space (SIFS), the method comprising:
determining, at a first device, using information associated with a second device, whether the second device associated with the first device in a wireless network supports the small SIFS, wherein the small SIFS defines a shorter time duration than a regular SIFS;
generating, by a medium access control sublayer logic module of the first device, a first data unit comprising a signal field portion having a bit set to a value, wherein the value of the bit of the signal field portion is set to 1 based on a result of said determining that the second device supports the small SIFS and the value of the bit of the signal field portion is set to 0 based on a result of said determining that the second device does not support the small SIFS, wherein the value of the bit equal to 1 indicates a time interval associated with the small SIFS and equal to 0 indicates a time interval associated with the regular SIFS, after which the first device anticipates receiving an acknowledgement for a second data unit received at the second device from the first device; and
transmitting, by an antenna of the first device, the first data unit to the second device.

13. The method of claim 12, wherein the first device comprises an access point of the wireless network.

14. The method of claim 12, further comprising, before said determining:
receiving, at the first device, an association data unit from each of a plurality of devices including the second device, wherein the association data unit comprises a bit set to a value to indicate whether that one of the plurality of devices supports the small SIFS; and
storing, in a memory device of the first device, information indicating whether each of the plurality of devices supports the small SIFS based on the bit of the respective association data unit.

15. The method of claim 14, wherein the association data unit comprises a management frame, and an extended capabilities field of the management frame comprises the bit of the association data unit.

16. The method of claim 12, wherein the first data unit comprises a preamble, and wherein the preamble comprises the field portion, the field portion comprising information related to a plurality of physical layer parameters related to the wireless communication of data units.

17. The method of claim 12, further comprising:
determining, at the first device, whether an acknowledgement frame for the first data unit is received from the second device after passing of a wait period, wherein the wait period is equal to a time duration associated with the small SIFS if the bit value of the field portion is set to 1, and is equal to a time duration associated with the regular SIFS if the bit value of the field portion is set to 0; and
re-transmitting, from the first device to the second device, the first data unit based on a determination that the acknowledgement frame is not received from the second device.

18. A method to detect small Short Interframe Space (SIFS), the method comprising:
receiving, at a first device, a data unit transmitted by a second device to a third device, wherein the second and third devices are associated in a wireless network; and
decoding, by a processor of the first device, a field portion of the data unit to determine a value of a bit of the field portion, wherein a first value of the bit is to indicate that a communication between the second and third devices including transmission of an acknowledgement from the third device for receipt of the data unit is anticipated according to a small SIFS duration, and a second value of the bit is to indicate that a communication between the second and third devices including transmission of an acknowledgement from the third device for receipt of the data unit is anticipated according to a regular SIFS duration,
wherein the small SIFS duration is shorter than the regular SIFS duration.

19. The method of claim 18, wherein the second device comprises an access point of the wireless network, and the field portion comprises a SIG field of a preamble of the data unit.

* * * * *